May 31, 1955   E. W. BLOMBERG ET AL   2,709,300
SHEARING ATTACHMENT FOR PORTABLE MOTOR TOOL
Filed July 14, 1952                                        2 Sheets-Sheet 2

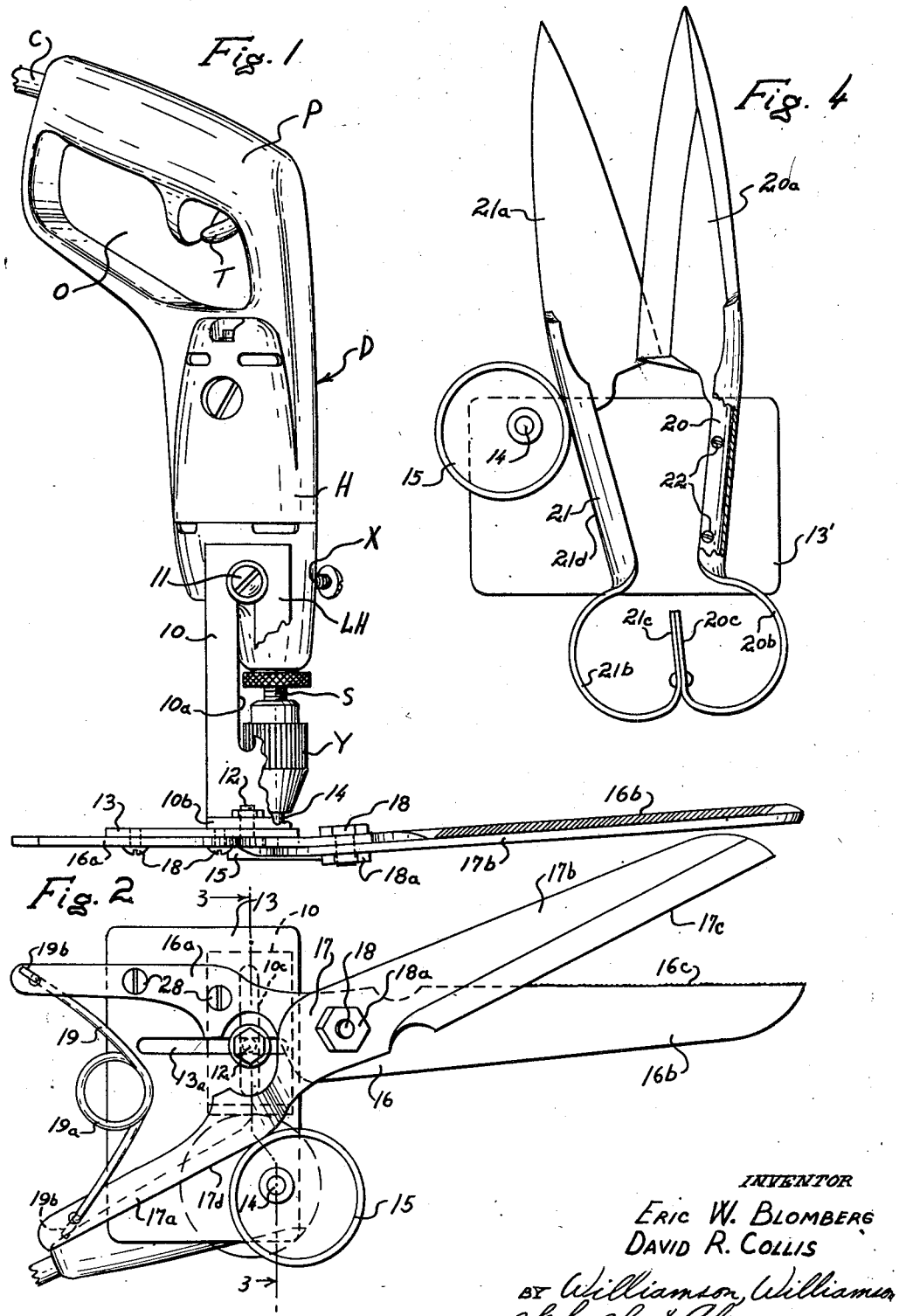

INVENTOR
Eric W. Blomberg
David R. Collis
BY Williamson, Williamson
Schroeder & Adams ATTORNEYS

United States Patent Office 2,709,300
Patented May 31, 1955

2,709,300

SHEARING ATTACHMENT FOR PORTABLE MOTOR TOOL

Eric W. Blomberg and David R. Collis, Minneapolis, Minn.

Application July 14, 1952, Serial No. 298,803

4 Claims. (Cl. 30—228)

This invention relates to power driven shears for trimming grass and weeds around trees, walks, and the like and for also trimming hedges and shrubbery.

At the present time, a number of manufacturers are making and selling small, portable, power drills usually equipped with a number of attachments for polishing, abrading, sawing and grinding.

It is an object of our invention to provide a simple, but highly efficient, shearing attachment for a power drill of the class described which may be readily attached to and supported from a portable power drill to provide a convenient power trimming mechanism for hedges, shrubbery and grass.

Another object is the provision of a shearing mechanism and attachment of the class described wherein a conventional handle or pistol grip of the portable drill and the elongated body thereof cooperate nicely in conveniently supporting the attached mechanism for operation of the shears upon the lawn or in an elevated position for trimming hedges or shrubbery. In such cooperative relation, the handle of the portable drill and the lever or trigger for controlling the motor switch are advantageously located for convenient manipulation in the use of our mechanism.

A still further object is the provision of mechanism or an attachment of the class described wherein a conventional pair of trimming shears may be easily applied and secured to our attachment mounting and eccentric driving means for efficiently constituting one form of our invention.

These and other objects and advantages of this invention will more fully appear from the following description made in connection with the accompanying drawings wherein like reference characters refer to the same or similar parts throughout the several views, and in which:

Fig. 1 is a side elevation showing a form of our invention operatively attached to a portable, electric power drill of conventional manufacture;

Fig. 2 is a bottom plan view of the same;

Fig. 4 is a bottom plan view of a somewhat different form of the invention wherein a well-known conventional pair of hand shears is employed, with one of the blade handles being rigidly attached to the base of our attachment and with the other handle being disposed in position to be swingably reciprocated through profile cam engagement with an eccentric driving member.

Figure 3:
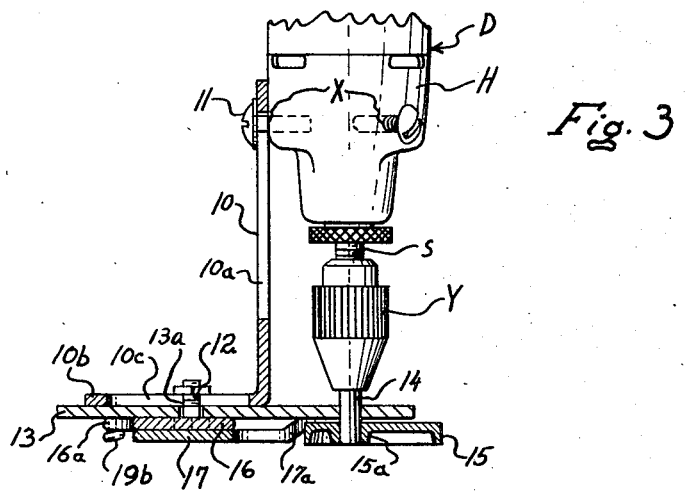
Figure 3 is a vertical section taken upon the line 3—3 of Figure 2 and showing the outer portion of the said electric power drill in elevation.

Referring now to the form of the invention shown in Figs. 1 to 3 inclusive, our shearing attachment is operatively applied to a conventional type of small electrical power drill indicated as an entirety by the letter D having the somewhat elongated motor housing H wherein is mounted the stator and rotor of an electric motor, the power take-off shaft S being disposed eccentrically of the motor armature shaft and connected in conventional manner for driving at reduced speed by gear mechanism disposed within the outer or lower portion LH of the motor housing. The housing H in conventional fashion is streamlined and provided near its outer end with a plurality of tapped sockets X disposed in circumferentially spaced relation to facilitate attachment and support of some of the auxiliary devices put out by the manufacturer for use with the tool as sold. The upper end of the motor housing H has rigidly attached thereto in conventional manner, an enlarged pistol grip handle P having an enlarged finger-receiving opening O therein which serves to nicely accommodate the fingers of the hand, permitting the index finger to be applied to a trigger lever T of an electrical switch mounted within the main handle portion P. The electrical service cord C in conventional manner extends into the butt of handle P and the conductors in said cord are properly connected with terminals of the switch for operation of the motor when the cord is connected to a supply outlet and the trigger T depressed.

Our shearing attachment comprises a simple but efficient mounting secured to and supported at its upper end by the outer portion of the motor housing LH. In the form of the invention shown in Figs. 1 to 3, the mounting includes a rigid, substantially straight, elongated plate 10 having a longitudinal adjustment slot 10a formed therein for accommodating an attachment bolt 11. The attachment bolt 11 is of a size and pitch so that its threaded end may engage one of the tapped sockets X of housing H to securely clamp the upper end of plate 10 against the housing and to secure the supporting plate in a predetermined depending or longitudinally projecting relation with reference to the power drill. Plate 10 at its lower end carries a perpendicularly extending, outturned arm 10b, preferably integrally formed therewith, which, when the mounting is attached, extends substantially radially relatively to the axis of the motor housing. Arm 10b is preferably provided with a longitudinal adjustment slot 10c (see Fig. 3) adapted to accommodate a nutted clamping bolt 12 which secures an adjustable rectangular base plate 13 to the mounting. The supporting plate 10 extends perpendicularly to the base plate and the base plate as shown in Fig. 2 has an adjustment slot 13a therein to facilitate, in cooperation with the slot 10c of arm 10, angular adjustment of base plate 13 relative to the arm 10.

The power shaft S of the drill carries in conventional manner, a chuck structure Y at the lower end thereof which is adapted to tightly secure, for driving connection, a drill or other rotary tool thereto. We provide a short shaft extension 14, the upper end of which may be rigidly secured to chuck Y to provide a rotary cam driving element for reciprocating the swingable blade of a pair of shears. Shaft 14 extends through an aperture or bearing formed in base 13 and in so doing, in cooperation with the mounting including elongated plate 10 and arm 10b, assists in positioning and centering the base and mounting with reference to the longitudinal center line of the motor housing. Below or outwardly of base 13, and rigidly affixed to the extension shaft 14, we provide an eccentric camming element 15 in the form of a metal disc eccentrically connected with shaft 14.

The eccentric cam 15 as shown in Fig. 3, is of preferably profile construction being concaved or recessed at its underside to diminish weight and fly wheel effect and having an eccentric bossed portion 15a through which the extension shaft 14 projects, the extremity of said shaft being welded or otherwise rigidly affixed to the bore of the bossed portion 15a.

We provide a suitable reciprocating shears mechanism mounted upon the underside of base plate 13 which, as shown in Figs. 1 to 3, comprises elongated blade members 16 and 17 respectively crossed at intermediate portions and pivoted together as shown by a heavy pivot bolt 18 having a threaded lower end which is adjustably engaged by a nut 18a. The blade member 16 has a longitudinal arm 16a preferably integrally formed therewith and, as shown, being somewhat offset longitudinally from the center line of the blade proper 16b. The arm 16a is preferably flat and is rigidly and preferably detachably secured transversely of base plate 13 by suitable means such as the screws 28 which threadedly engage tapped sockets or apertures formed in the base plate at proper points for such attachment. The full length of the cutting edge 16c of blade 16b extends outwardly and forwardly from the base plate 13 in preferably a radial relation to the motor housing H. The blade member 17 is pivoted for free swinging action to the stationary blade 16 and is provided with a rigid lever arm extension 17a which is preferably offset somewhat longitudinally from the blade portion 17b. Blade 17b is beveled from an intermediate longitudinal line thereof to its sharpened cutting edge 17c which is disposed with shearing effect against the cutting edge 16c of the blade member 16. The outer longitudinal edge 17d of the lever arm 17a is positioned in engagement with the periphery of the eccentric cam 15 and, as shown in Fig. 2, the shears are almost in full opened position with the cam engaging the said outer longitudinal edge 17d and with said edge being maintained always in engagement with the periphery of the cam through application of a suitable resilient spreading device to urge the ends of arms 16a and 17a apart. While any suitable spring medium may be utilized to accomplish said resilient spreading action, we employ, in the form shown in Figs. 1 to 3 inclusive, an expansion wire spring 19 preferably coiled in one or more convolutions 19a and having its extremities 19b upturned as shown in Figs. 2 and 3 to engage and be retained in apertures formed at the ends of the lever arms 16a and 17b. The body and coil or coils of spring 19 lie substantially in a plane beneath the blade members. It is of course to be understood that in applying the spring 19, the ends thereof are urged together to substantially tension the spring and the extremities with such spring tensioned, are tightly accommodated in the apertures provided in the arms 16a and 17b and, if desired, the very extremities of the turned portions 19b may be swedged against the upper side of the blade arms to securely retain the spring in proper operative relation.

*Operation*

With our attachment constructed and operatively assembled as previously described, the shear members will be urged apart constantly by the tension spring 19. This action always positions the cam-contacting, longitudinal edge 17d of lever arm 17a against the periphery of the eccentric cam 15 and supplies the force for spreading the blade members apart in their reciprocating operation. Our attachment is very conveniently related with the elongated housing and handle P of conventional power drills to enable the operator to hold the drill in a depending relation and operate the trigger member 10 with the index finger. This holding of the device enables the shear blades to be positioned adjacent the ground in trimming grass or weeds around trees, walks and the like. It also provides a very convenient manipulation of the device with the drill disposed in depending relation when low hedges and shrubbery are to be trimmed.

In trimming tall shrubbery or relatively high hedges, the position of the drill is reversed and it is almost equally convenient to hold the shears in an elevated relationship with the drill inverted from its position shown in Fig. 1.

Rapid revolution of the power shaft S of the drill of course revolves the axially aligned extension shaft 14 at identical speed which drives the eccentric cam 15. This cam throughout one revolution nicely operates the swingable blade member 17 to positively close the same, swinging the blade edge 17c inwardly into opposition to the stationary cutting edge 16c of the second blade. The eccentric cam operation is smooth, graduated and progressive with the result that no jerkiness is present in the shearing operation.

The rotary shaft 14 by extending through base 13 provides a bearing in the base 13 and thereby assists in anchoring and centering the base and mounting.

In Fig. 4, a bottom plan view of another form of the invention is shown where the manufacturer of the drill and our attachment, or of the attachment, need not supply the shearing mechanism. Here, a conventional old type of trimming shears is utilized with one of the blade arms 20 suitably affixed as by bolts 22 to the underside of the base plate 13' of the attachment. The conventional shears illustrated in Fig. 4 do not have crossed blade members but have relatively thin shearing blades 20a and 21a respectively disposed in overlapped relation and having secured to the inner and widened portions thereof, rigid handle members 20 and 21 respectively which handle members may be of channel form welded at their outer portions to the butts of the blades 20a and 21a and having secured or integrally formed with the ends thereof, curved leaf spring elements 20b and 21b respectively. The leaf spring elements as shown, curve through arcs of approximately 210 degrees and terminate in flatted and straight abutment portions 20c and 21c which are positioned approximately on the radial divider line bisecting the angle defined between the handle arms 20 and 21.

All of the above defined shear construction is well known and conventional and further description thereof is thought unnecessary.

The channel shaped handle member 20 may be drilled through the two spaced webs thereof to accommodate the screws 22, thus, in the construction of our invention and application to the mounting bracket, positioning the blade 20a in stationary manner supported from the underside of base plate 13'.

An eccentric camming member or disc 15 substantially identical with cam 15 of the form first described, is welded or otherwise rigidly affixed to the extension stub shaft 14 of the second form of the invention and the expansive force of the leaf springs 20b and 21b urge the outside longitudinal edge 21d of the handle member 21 into constant engagement with the periphery of cam 15.

Figure 6:
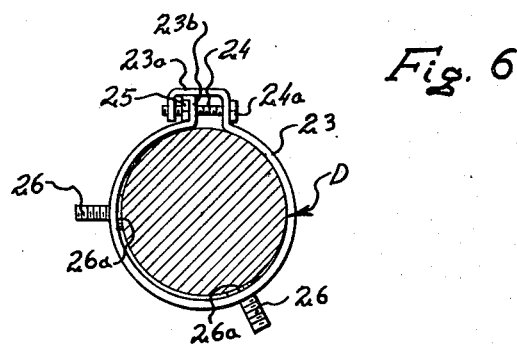
Fig. 6 is a cross section taken on the line 6—6 of Fig. 5.
Figure 5:
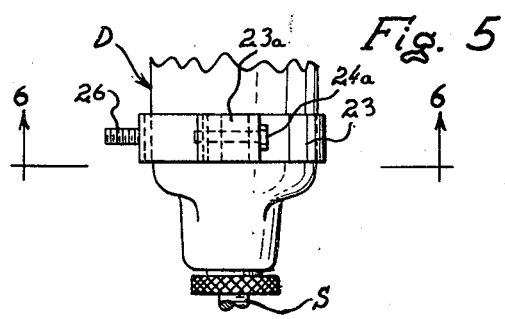
Fig. 5 is a fragmentary side elevation showing a somewhat different form of attachment medium for securing the supporting frame and working mechanism of our structure to the motor casing of a portable power drill.

Operation of the second form of our device is similar to that of the form first described. In Figs. 5 and 6, a suitable means of attaching our mounting including the elongated plate 10 is illustrated for use in electrical power drills which are not provided by the manufacturer with tapped sockets such as the sockets X of the form first described. Here, a split clamping ring 23 is utilized of a diameter to engage the periphery of drill housing, varying within a range of for example, an inch in diameter. The clamping ring 23 may be constructed of strap metal having some resiliency and one end thereof is formed into a shallow, inverted, U-shape 23a to receive a clamping bolt 24 in spanning relation to the opposite outturned end 23b, which may be turned at its extremity to accommodate and anchor a nut 25 threadedly engaging the bolt 24. Size adjustment is made by tightening the head 24a of the bolt to securely clamp the ring 23 and its related attachment-retaining elements 26 upon the cylindrical periphery of the power drill housing.

Suitable attachment-retaining elements such as the detachable, externally threaded bolts 26 may be utilized having relatively thin disc heads 26a which are preferably ground at their inner surfaces to a cylindrical contour for nicely fitting against the periphery of the housing.

From the foregoing description it will be seen that we have provided a shearing mechanism particularly adapted for ready and positive attachment to conventional, small, electric power drills now extensively sold throughout the United States and foreign countries.

It will further be seen that the provision of our simple but widely adjustable mounting structure with longitudinally extending mounting plate 10 angled outwardly extending arm and base plate, enables the device to be positively attached to various drills through the quick connection of a minimum of one fastening element. In this connection, the revolving extension shaft of our structure provides another important anchoring point for the entire mounting and serves to stabilize the device.

It will of course be understood that various changes may be made in the form, details, arrangement and proportions of the parts without departing from the scope of our invention.

What we claim is:

1. A shearing attachment for a portable, motored tool of the type having a motor housing, a handle secured thereto and a power shaft extending from one end of said housing; said attachment comprising a mounting having means at one end thereof for rigid connection with said motor housing and having a rigid base at the opposite end thereof for positioning outwardly of and transversely to the power shaft of the tool, an extension shaft for connection with the power shaft of said motor, said base having a bearing bore to snugly accommodate the outwardly projecting portion of said extension shaft whereby the centering of said base is obtained, said extension shaft having a shear reciprocating member connected with the outer end thereof, said member being disposed in close relation to the outer or bottom portion of said base, said base having means for attachment of a pair of swinging shears to hold one of the blade members of the shears in stationary relation thereto, and said shear reciprocating member being positioned for engagement with the other blade member of said swinging shears to swing the same.

2. The structure set forth in claim 1 wherein said shears reciprocating member on said extension shaft is in the form of an eccentric cam with its peripheral edge disposed in camming engagement with the longitudinally extended handle on the movable shearing blade.

3. A shearing attachment for a portable, motored tool of the type having a motor housing, a handle fixed to one of the end portions of said housing and extending generally longitudinally thereof and a power shaft extending from one end of said housing; said attachment comprising a mounting having means at one end thereof for rigid connection with said motor housing, said mounting when so connected extending generally longitudinally from said housing and having a rigid base at the outer end thereof positioned outwardly of and transversely to the power shaft of said tool, an extension shaft for axial driving connection with said motor power shaft and extending through and being journaled in said base and serving to position and anchor said base with reference to said tool, the outer end of said shaft having a disc cam eccentrically fixed thereto and disposed in close, underlying relation to said base, a pair of shears mounted upon and supported from said base and having a shearing blade member fixed to said base in a predetermined stationary relation relative thereto, said shears having a swingable blade member connected with said first mentioned blade member and having a cutting edge adapted to be lapped with the cutting edge of said first shearing member, said swingable shearing member having a cam receiving edge disposed inwardly of the general axis of swinging and positioned in engagement with said camming member and resilient means for internally urging said shearing blade members apart.

4. A shearing attachment for a portable motor tool comprising a mounting bracket longitudinally adjustable on the motor tool and having an out-turned base attachment portion, a base rigidly but adjustably attached to said attachment portion and adapted to underlie the power take-off of the tool, an extension shaft and means at the upper end thereof for fixed connection with the power take-off of the tool, said base having a bore therethrough for receiving the lower end of said extension shaft to journal the same and assist in the proper positioning of said base, the outer portion of said shaft having a disc cam eccentrically fixed thereto and disposed in close, underlying relation to said base, a pair of shears mounted upon and supported from said base and having one shearing blade member fixed to said base in a predetermined, stationary relation thereto, said shears also having a swingable blade member pivotally connected with said first blade member and having a cam-receiving edge disposed in engagement with the periphery of said disc cam and resilient means for urging said blade members apart.

References Cited in the file of this patent

UNITED STATES PATENTS

| | | |
|---|---|---|
| 549,476 | Caldwell | Nov. 5, 1895 |
| 1,572,791 | Guymon | Feb. 9, 1926 |
| 1,710,347 | Cohen | Apr. 23, 1929 |
| 2,559,725 | Mansperger | July 10, 1951 |
| 2,584,487 | Mischke | Feb. 5, 1952 |